US012671242B2

(12) United States Patent
Gajanayake et al.

(10) Patent No.: US 12,671,242 B2
(45) Date of Patent: Jun. 30, 2026

(54) POWER PROTECTION SYSTEM

(71) Applicant: Rolls-Royce Deutschland Ltd & Co KG, Blankenfelde-Mahlow (DE)

(72) Inventors: Chandana Gajanayake, Singapore (SG); Anh Vu Ho, Singapore (SG); Mohamed Sathik Mohamed Halick, Singapore (SG)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 194 days.

(21) Appl. No.: 18/738,641

(22) Filed: Jun. 10, 2024

(65) Prior Publication Data

US 2025/0030234 A1 Jan. 23, 2025

(30) Foreign Application Priority Data

Jul. 18, 2023 (GB) ...................................... 2310964

(51) Int. Cl.
*H02H 3/26* (2006.01)
*H02H 1/00* (2006.01)

(52) U.S. Cl.
CPC ............ *H02H 3/26* (2013.01); *H02H 1/0007* (2013.01)

(58) Field of Classification Search
CPC ...... H01H 9/548; H02H 1/0007; H02H 3/025; H02H 3/05; H02H 3/087; H02H 3/26; H02H 3/445; H02H 7/268
USPC ........................................................ 361/86
See application file for complete search history.

(56) References Cited

U.S. PATENT DOCUMENTS

| | | | |
|---|---|---|---|
| 2009/0310270 A1 | 12/2009 | Burns et al. | |
| 2012/0235661 A1* | 9/2012 | Roessler | H02H 3/087 |
| | | | 323/284 |
| 2014/0029152 A1* | 1/2014 | Mazzola | H03K 17/6871 |
| | | | 361/115 |

(Continued)

FOREIGN PATENT DOCUMENTS

| | | | |
|---|---|---|---|
| EP | 3754346 A1 | 12/2020 | |
| KR | 20220135015 A | * 10/2022 | H03K 17/08104 |

OTHER PUBLICATIONS

Machine translation of Yun et al. Korean Patent Document KR 20220135015 A Oct. 2022 (Year: 2022).*

(Continued)

*Primary Examiner* — Kevin J Comber
(74) *Attorney, Agent, or Firm* — Lempia Summerfield Katz LLC

(57) ABSTRACT

A power protection system includes a first DC power source, a first load, a first power bus connecting the first power source and the first load, and a first solid state circuit breaker circuit integrated in the first power bus. The first solid state circuit breaker circuit includes a first semiconductor switch, a first capacitor arranged between the high side voltage rail and the low side voltage rail closer to the power source or to the load than the semiconductor switch, and a first inductor located such that current generated by the first capacitor when unloading in case of a short circuit at the power source or at the load passes the first inductor. The controller is configured to measure a voltage change over the first inductor and trigger an actuation signal for the first semiconductor switch if a voltage change surpasses a predetermined threshold voltage.

14 Claims, 6 Drawing Sheets

(56) References Cited

U.S. PATENT DOCUMENTS

2014/0268465 A1\* 9/2014 Veliadis ................ H02H 3/087
                                                      361/101
2017/0104327 A1\* 4/2017 Nojima .................... H02H 3/44

OTHER PUBLICATIONS

Great Britain Search Report for GB Application No. 2310964.8, mailed Jan. 15, 2024.
European Search Report for App. No. 24178791.0 mailed Nov. 29, 2024, pp. 1-6.

\* cited by examiner

POWER PROTECTION SYSTEM

This specification is based upon and claims the benefit of priority from United Kingdom patent application GB 2310964.8, filed Jul. 18, 2023, the entire content of which is incorporated herein by reference.

TECHNICAL FIELD

The present disclosure relates a power protection system, in particular for aerospace direct current (DC) power protection systems.

BACKGROUND

Reliability, availability, and protection are critical to maintain the safety and integrity of aircraft DC power distribution systems. A lack of adequate DC protection devices, poor response times, and an inability to meet aerospace system requirements makes Solid State Circuit Breakers (SSCB) an attractive solution for aerospace DC power distribution and protection. On many occasions, a system has multiple energy sources such as multiple batteries or a mixture of batteries and fuel cells or turbogenerator systems, and multiple loads such as electric propulsion units and pumps. Multiple loads and sources may be connected to a DC distribution system.

SSCBs use semiconductor devices to interrupt DC currents in case of a fault such as a short-circuit, show a fast response time, and have a high reliability, such that they are preferred over electro-mechanical circuit breakers.

There is a need to stop a fault current, isolate, and de-energize the faulted portion of a circuit as fast as possible to minimize the stress on the rest of the system. Thus, there is a desire for protection systems with very fast fault detection to improve the response time of SSCBs.

There is a need to provide a power protection system with a Solid State Circuit Breaker that allows for very fast fault detection and a quick response time in case of a fault, or at least provides a useful alternative to known power protection systems.

SUMMARY AND DESCRIPTION

In a first aspect, there is provided a power protection system. The system includes a first DC power source having a positive terminal and a negative terminal, a first load, and a first power bus connecting the first power source and the first load. The first power bus includes a high side voltage rail connected to the positive terminal and a low side voltage rail connected to the negative terminal. The system further includes a first solid state circuit breaker circuit integrated in the first power bus, wherein the solid state circuit breaker circuit is located at a power source side or at a load side of the first power bus.

The solid state circuit breaker includes a first semiconductor switch arranged in the high side voltage rail or in the low side voltage rail and controlled by a control unit, a first capacitor arranged between the high side voltage rail and the low side voltage rail, and a first inductor in one of the high side voltage rail and the low side voltage rail. The first capacitor is arranged between the high side voltage rail and the low side voltage rail such that the first capacitator is located closer to the power source or to the load than the semiconductor switch, wherein a terminal of the first capacitor is arranged between the first semiconductor switch and the power source or between the first semiconductor switch and the load. The first inductor is located such that current generated by the first capacitor when unloading in case of a short circuit at the power source or at the load passes the first inductor.

It is further provided that the control unit is configured to measure a voltage change over the first inductor and trigger an actuation signal for the first semiconductor switch if a voltage change over the first inductor surpasses a predetermined threshold voltage.

Aspects of the present disclosure are thus based on the idea of strategically placing an additional (first) capacitor and (first) inductor as close as possible to the load or to the source. In case of a short-circuit, the capacitor unloads through the short-circuited load/source and the inductor, thereby causing a boosting current and voltage rise in the inductor that may be detected and used for triggering shutting the SSCB off. As the additional capacitor provides the least resistance path, it will discharge very quickly, thereby providing the boosting current to the measuring inductor. This way, the present disclosure increases the quality of fault detection and allows faster clearance of a fault.

The capacitance of the additional capacitor depends on the circuit conditions, but it may be small compared to a load capacitance included in the load. A small capacitance of the capacitor and its placement in close proximity to the source or load (that may experience a short-circuit) allows ultrafast unloading of the capacitor in case of a short-circuit, thereby providing a boosting current to the inductor that is detected in a short time. In some embodiments, the capacitance of the capacitor may lie in the range between 1 and 10 μF.

A further advantage lies in that the additional (first) capacitor decouples the main circuit from the short-circuited load/source in microsecond timescale, due to smaller inductance in the conduction path.

A still further advantage lies in that significant weight saving compared to the prior art may be achieved where contactors or hybrid breakers are used and as large and bulky inductors to slow a current rise are not required with the present disclosure. The proposed capacitors are light weight and, if film capacitors are used, they are fail-safe.

In some embodiments, a first bypass diode is arranged in parallel to the first capacitor between the high side voltage rail and the low side voltage rail in the blocking direction. The diode bypasses the (first) capacitor from charging in the opposite direction that may be caused by higher frequency components such as switching noise and/or harmonics of an inverter representing the load.

In some embodiments, the solid state circuit breaker circuit has a bidirectional conductivity and blocking capability. In such case, the solid-state circuit breaker circuit may include two transistors (such as MOSFET or IGBT) in a row each with antiparallel diodes. A bidirectional SSCB may be implemented if the load is with regenerative capability. If using a bidirectional SSCB, such SSCB may be implemented with or without positive and negative breaking capability (meaning that both the high side voltage rail and the low side voltage rail show a bidirectional connectivity and blocking capability versus only one of these shows a bidirectional connectivity and blocking capability). Another occasion in which a bidirectional SSCB may be used is if the used power source includes a high risk of ground fault.

In some embodiments, the solid state circuit breaker circuit has a unidirectional conductivity and blocking capability. Such SSCB may be implemented if the load is with a minimum or no regenerated capability.

In some embodiments, the first semiconductor switch includes a transistor and a bypass diode in antiparallel to the transistor, wherein the transistor is a metal-oxide-semiconductor field-effect transistor (MOSFET), an insulated-gate bipolar transistor (IGBT), a Gallium Nitride (GaN) transistor, or a Silicon carbide (SiC) transistor. The semiconductor switch may include several of such transistors and bypass diodes (such as in case of a bidirectional SSCB).

In some embodiments, a transient voltage suppressor (TVS) device is arranged in parallel to the semiconductor switch. Such TVS device serves to protect the semiconductor switch by preventing the semiconductor switch from over-voltage stress in a short-circuit condition when a discontinued current flow creates over-voltage that needs to be clamped to a designed voltage level across the TVS device to avoid failure of the semiconductor switch. When the SSCB trips, the current will be bypassed via the parallel TVS device.

In some embodiments, at least one mechanical contactor is additionally provided that is arranged in series with at least one of the solid state circuit breaker circuits. The mechanical contactor allows to provide for galvanic isolation. The series connection off a mechanical contactor and an SSCB may be such that the contactor is opened to provide galvanic isolation once a fault has been detected and cleared by the SSCB.

In some embodiments, the first load includes a capacitive load, wherein the capacitive load is arranged in parallel with the first capacitor, and wherein the capacitive load, the first capacitor, and the first inductor form a third order filter. This embodiment considers the situation that a load (such as an inverter) may include a capacitive load between the high side voltage rail and the low side voltage rail (the capacitive load also referred to as DC link capacitor). The capacitive load buffers energy and filters any AC noise present in the DC line. When further considering the capacitive load, the additional (first) capacitor may have an even smaller capacitance that allows even quicker discharging and boosting the inductor current.

In some embodiments, the controller that controls the semiconductor switch is configured to measure the voltage over the first inductor and to switch the first semiconductor switch off if the measured voltage is larger than the predetermined threshold voltage. In this respect, it is to be noted that the voltage across the inductor is equal to $dI/dt$ of the current I. If the current I is increased by a boosted current caused by discharging off the (first) capacitor, the voltage over the inductor surpasses the predetermined threshold voltage.

In the above, only one SSCB has been considered to be present in a power protection system with one power source and one load. However, in some embodiments, two SSCBs are present, one proximate to the power source and one proximate to the load. This allows to independently break the current in case of a fault at the power source side and in case of a fault at the load side. In such embodiment, the power protection system includes the first solid state circuit breaker circuit and a second solid state circuit breaker circuit including similar components as the first solid state circuit breaker circuit, namely, a second semiconductor switch, a second capacitor and a second inductor, wherein the first solid state circuit breaker circuit is arranged at the power source side and the second solid state circuit breaker circuit is arranged at the load side of the power protection system.

Further, in the above, a power protection system with only one power source and only one load has been considered. However, in some embodiments, the power protection system may include several power sources and several loads, such that the system is part of such larger power protection system. Also, the system may be implemented in some or all parts of a larger power protection system, such as in an SSCB at the power source side of the first power bus, and SSCB at the power source side of a second power bus, and SSCB at the load side of the first power bus, and an SSCB at the load side of the second power bus.

In such embodiments, the power protection system includes: the first DC power source and a second DC power source, each power source having a positive terminal and a negative terminal; the first load and a second load; the first power bus connecting the first power source and the first load and a second power bus connecting the second power source and the second load, each power bus including a high side voltage rail connected to the respective positive terminal and a low side voltage rail connected to the respective negative terminal; and the first and second solid state circuit breaker circuits integrated in the first power bus and a third and a fourth solid state circuit breaker circuit integrated into the second power bus (the third and fourth solid state circuit breaker circuits may be configured in the same manner as the first and second solid state circuit breaker circuits). In such embodiments, the high side voltage rail of the first power bus and the high side voltage rail of the second power bus are connected and the low side voltage rail of the first power bus and the low side voltage rail of the second power bus are connected.

By the connection of the high side voltage rails and the connection of the low side voltage rails of the two power busses, redundancy is provided. Specifically, the two energy sources may drive one load such as an electric drive if the other load fails, and one energy source may drive to loads if one of the energy sources fails. The redundancy may be increased by having additional power sources, loads, and connecting power busses.

This aspect of the present disclosure addresses one main challenge in DC protection, which is, when a short circuit fault happens in any one of the branches of a DC network, all sources and loads see the fault and the DC power busses tend to collapse. By providing SSCBs with ultrafast response times in accordance with the present disclosure in all power busses both at the power source side and at the load side, this problem is solved.

A further advantage lies in the ability to manage the short circuit fault without collapsing the DC link in a multi SSCB architecture. It is further pointed out that, as each SSCB is controlled by an associated control unit, shutting down of SSCBs is achieved locally, without the requirement of using any communication among different SSCB units, thereby additionally saving time.

In certain examples, the high side voltage rail of the first power bus and the high side voltage rail of the second power bus are connected in a point in between the respective solid state circuit breaker circuits. Similarly, the low side voltage rail of the first power bus and the low side voltage rail of the second power bus may be connected in a point in between the respective solid state circuit breaker circuits. This way, the connection of the two power buses does not interfere with the SSCBs.

In some embodiments, a middle capacitor is arranged between the high side voltage rail and the low side voltage rail, wherein the middle capacitor is arranged at a point in between the solid state circuit breaker circuit located at the power source side and the solid state circuit breaker circuit located at the load side. This way, the middle capacitor may provide energy to any of the SSCBs. The middle capacitor provides additional capability to hold the power bus voltage for a longer time and prevent it from collapsing in case of a short circuit until the fault is cleared. Further, the middle capacitor supports the first or any other additional capacitor when providing a booster current to the additional inductor. In some embodiments, the capacitance of the middle capacitor may lie in the range of 10 to 50 μF. The capacitance of the middle capacitor may be higher than the capacitance of the additional capacitors.

In some embodiments, each inductor which receives a booster current is associated with a corresponding control unit, wherein the control unit receives the inductor voltage measurement and provides a gate signals to the semiconductor switch. This allows for quick and decentralized switching of the semiconductor switch in case of a fault without the necessity to communicate among the different breaking units. At the same time, all control units may be controlled by a single master controller for communication with a higher level controller.

In principle, the first load and second load may be any load. In some embodiments, the load may be a power converter such as an inverter.

In case the load includes a load capacitance, the first capacitor may be sized such that the capacitance of the first capacitor is smaller than that of the capacitive load, as discussed before.

The skilled person will appreciate that except where mutually exclusive, a feature, or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

The power protection system of the present disclosure are explained in more detail with reference to the embodiments and the accompanying drawings in which.

DETAILED DESCRIPTION

With increased penetration of electrical systems and the progression towards full electric and hybrid propulsion systems, the use of energy storage system DC power distribution has gained increased use. Protection and distribution network reliability is one of the bottlenecks and proves to be a critical technology in this system. Traditional protection devices, such as fuses and contactors are not suitable due to their response times, their weights, and their dead time. Therefore, there has been increased demand for Solid State Circuit Breakers, SSCBs.

Figure 1:
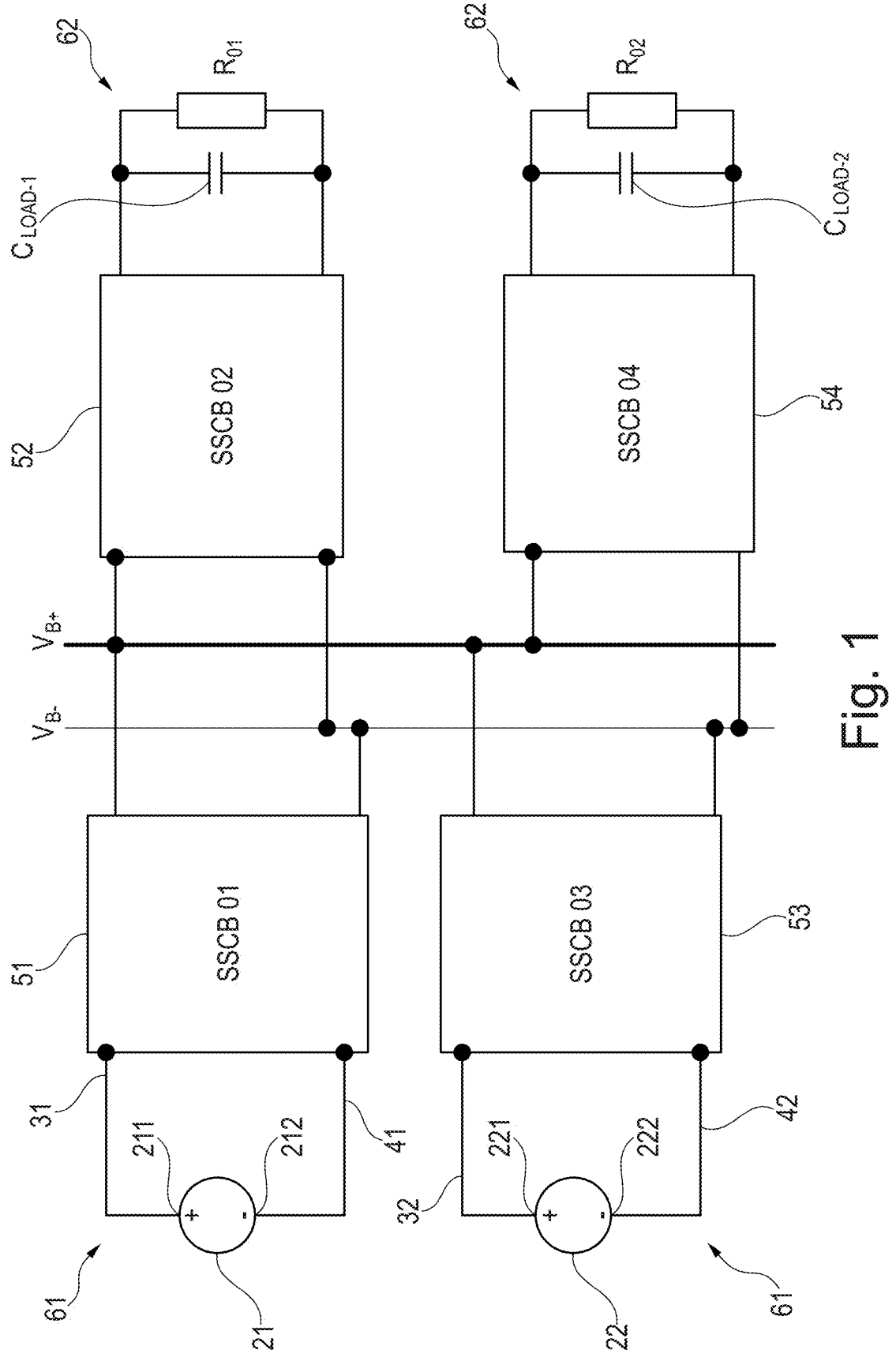
FIG. 1 shows an example architecture of a DC distribution system having two power sources and two loads, wherein four schematically depicted SSCB units are provided for power protection, two SSCBs associated with the sources, and two SSCBs associated with the loads.

FIG. 1 shows schematically an electric distribution architecture in which two power sources 21, 22 and two loads R01, R02 are connected through a distribution system. Such system may be used in hybrid propulsion system applications.

More particularly, the system of FIG. 1 includes a first power source 21 and a first load R01 connected through a first power bus 31, 41. The first power source 21 has a positive terminal 211 and a negative terminal 212. Between these terminals 211, 212 a constant DC voltage such as a battery voltage is present. A high side voltage rail 31 is connected to the DC positive terminal 211 and a low side voltage rail 41 is connected to the DC negative terminal 212. The high side voltage rail 31 and the low side voltage rail 41 form the first power bus.

In a similar manner, the system further includes a second power source 22 and a second load R02 connected through a second power bus 32, 42. The second power source 22 has a positive terminal 221 and a negative terminal 222. Between these terminals 221, 222, a constant DC voltage such as a battery voltage is present. A high side voltage rail 32 is connected to the DC positive terminal 221 and a low side voltage rail 42 is connected to the DC negative terminal 222. The high side voltage rail 32 and the low side voltage rail 42 form the second power bus.

Further, the first and second power buses are interconnected. To this end, the high side voltage rail 31 of the first power bus and the high side voltage rail 32 of the second power bus are connected. Further, the low side voltage rail 41 of the first power bus and the low side voltage rail 42 of the second power bus are connected. Accordingly, the same voltage VB+ is present at the high side voltage rails 31, 32, and the same voltage VB− is present at the low side voltage rails 41, 42. In case one of the loads R01, R02 fails, both power sources 21, 22 may be used to power the remaining load. Further, in case one of the power sources 21, 22 fails, the remaining power source may power both loads R01, R02.

There may be provided further power sources and loads connected to the system in the same manner.

In aerospace applications, the power sources 21, 22 may be battery energy storage systems or fuel cells or be fed from a turbo generator/active rectifier.

The system of FIG. 1 further includes four SSCBs 51-54, wherein SSCB 51 is located at the power source side 61 of the first power bus, SSCB 52 is located at the load side 62 of the first power bus, SSCB 53 is located at the power source side 61 of the second power bus, and SSCB 54 is located at the side 62 of the second power bus. The SSCB units 51-54 provide protection function for the respective individual lanes 31, 32, 41, 42 at the power source side 61 and at the load side 62.

The SSCBs 51-54 are depicted schematically in FIG. 1. They include semiconductor switches as explained in greater detail below. Each SSCB 51-54 may include semiconductor switches arranged in the high side voltage rail and/or semiconductor switches arranged in the low side voltage rails. In this respect, a plurality of configurations is possible. Depending on the type of source or load, a suitable topology for each of the protection units 51-54 is selected. For example, if the load is with minimum or no regenerative capability, then unidirectional SSCBs may be used. If the load is with regenerative capability, then SSCBs with bidirectional protection may be selected, which may be with positive and negative breaking capability (e.g., semiconductor switches are arranged both on the high side voltage rail and on the low side voltage rail) or without positive and negative breaking capability (e.g., semiconductor switches are arranged on the high side voltage rail or on the low side voltage rail).

For example, if the power source is a rectifier extracting power from a turbo generator (such as from a high-pressure shaft, a low-pressure shaft, or an intermediate pressure shaft of a gas turbine engine), the SSCB may be bidirectional. If the power source is a DC supply like battery or fuel cell, which has a higher risk of ground fault, then SSCBs with bidirectional protection capability and positive and negative lane breaking capability may be adopted. Selection of the suitable SSCB topology helps to reduce the number of active devices needed to use and reduce the losses on the SSCB.

Figure 2:
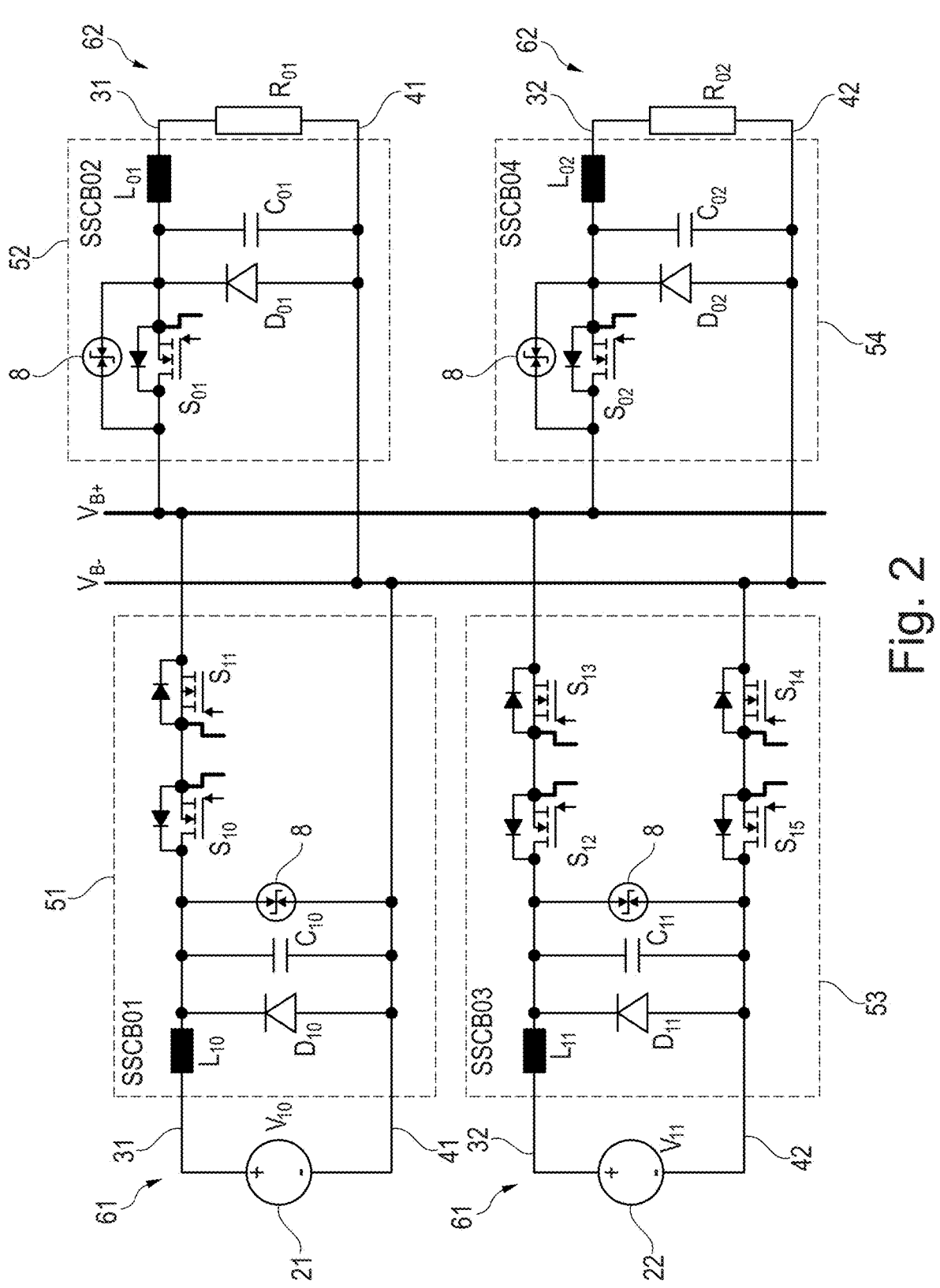
FIG. 2 shows an embodiment of a DC power protection system that may be used in a hybrid propulsion system application, the DC power protection system having a two power sources, two loads, and two SSCBs similar to FIG. 2, each SSCB including an additional capacitor and an additional inductor for ultrafast detection of a fault at the load side or at the power source side.

Embodiments of the above-mentioned three types/topologies of an SSCB (unidirectional, bidirectional on one lane, bidirectional on both lanes) are discussed in FIG. 2.

The system of FIG. 1 further depicts schematically load capacitors $C_{LOAD\_1}$, $C_{LOAD\_2}$ that represent a capacitive part of the load R01, R02.

The loads R01, R02, in principle, may be any load. In embodiments, each load R01, R02 includes an inverter circuitry. Each inverter circuitry may include six semiconductor power switches that provide for a three-phase current as is well known to the person skilled in the art.

One of the main problems in DC distribution systems is when a fault happens, it will be seen by all the connected systems, and if there are energy source or capacitors in the power busses, they start contributing to the fault location. This makes it very challenging for reliable fault identification and isolation.

FIG. 2 shows a first embodiment of a power protection circuit in accordance with aspects of the present disclosure. As to the general system architecture, FIG. 1 depicts an example of a power protection circuit including two power sources 21, 22, two power buses 31, 41, 32, 42, and two loads R01, R02, wherein the power buses are interconnected to provide the same voltage VB+, VB−1 on the high side voltage rails and the low side voltage rails.

FIG. 2 shows more details and embodiments of the SSPCs 51-54. Each SSPC includes at least one semiconductor switch, wherein FIG. 2 shows three possible configurations of the switching unit of an SSPC. In SSPC 51, the switching unit is bidirectional and located in the high side voltage rail 31. It includes two switches S10, S11 arranged in a row each including a transistor with an antiparallel diode. The antiparallel diodes give current that flows in the opposite direction a path to flow. Without the diodes, inductive currents would cease instantly, generating high voltage peaks. SSPC 51 is bidirectional on the high side voltage rail 31.

In SSPC 52, the switching unit is unidirectional with one switch S01 including a transistor and an antiparallel diode. In SSPC 53, the switching unit is bidirectional on both lanes and includes two switches S12, S13 on the high side voltage rail 32 and two switches S14, S15 on the low side voltage rail 42, and thus able to isolate both voltage rails 32, 42 in case of a fault. In SSPC 54, the same configuration is present as in SSPC 52.

The switches S10, S11, S01, S12-S15, S02 may be MOSFET, GaN (Gallium Nitride), SiC (Silicon Carbide), or IGBT (Insulated Gate Bipolar Transistor) switches. They are controlled by the respective gate voltage, which is provided by a control unit, as discussed with respect to FIG. 4.

The different configurations of the switching units in FIG. 2 are exemplary only. For example, the same configuration of the switching unit may be used in all SSPCs 51 to 54, or the configuration may be different (with, e.g., the switching unit of SSBC 52 being bidirectional).

In accordance with aspects of the present disclosure, in each of the SSCBs 51-54, a small capacitor C10, C01, C11, C02 and a small inductor L10, L01, L11, L02 at the load/source facing terminal are provided. For example, when considering load facing SSPC 52, capacitor C01 having terminals 101, 102 is arranged between the high side voltage rail 31 and the low side voltage rail 42, wherein capacitor C01 is located as close as possible to the load, which implies that terminal 101 is arranged between the semiconductor switch S01 and the load R01. In case of a short circuit in the load R01, the capacitor C01 unloads through the load R01. The inductor L01 is arranged such in the high side voltage rail 31 that current generated by the capacitor C01 when unloading in case of a short circuit passes the inductor L01, thereby creating a boosting current in the inductor L01 that leads to a voltage change over the inductor L01 that is measured and triggers a shut-off signal for the semiconductor switch S01, thereby turning off the load R01.

The arrangement of the capacitor C01 and of the inductor L01 directly at the load side allows for a very fast fault detection. As the small capacitor C01 provides the least resistance path, it will discharge very quickly providing the boosting current to the measuring inductor L01. Also, the small capacitor C01 decouples the main circuit in microsecond time scales, this being due to device resistance and smaller inductance in the conduction path. The rest of the circuit will see a delayed effect in few microseconds scale giving sufficient time to detect and give an actuation signal to switch S01.

The capacitance of the capacitors C10, C11, C01, C02 may lie in the range between 10 and 1 and 10 µF.

The voltage across the inductor L10, L01, L11, L02 is equal to dI/dt of the current I and hence it will give very fast and clear fault detection compared to other methods.

The above explanation of the function of capacitor C01 and inductor L01 in SSPC 52 applies similarly to the capacitors C10, C11, C02 and inductors L10, L11, L02 of the other SSPCs 51, 53, 54.

The distributed capacitors C10, C11, C01, C02 may be sized to avoid collapsing of the bus voltage and give sufficient delay time to allow fault detection.

The SSPCs 51-54 further each include a diode D10, D01, D11, D02 arranged in parallel to the respective capacitor C10, C11, C01, C02. The diode D10, D01, D11, D02 is added to provide a continued current path after breaking the switch S10, S11, S01, S12-S15, S02 and bypass the capacitor C10, C11, C01, C02 from charging in the opposite direction.

The SSPCs 51-54 further include a transient voltage suppressor (TVS) device 8. For example, in SSPC 52, a TVS device 8 is arranged in parallel to the semiconductor switch S01. The TVS device 8 is added to protect the semiconductor switch S01 if an over voltage created by a discontinued current flow in case of a child circuit occurs that needs to be clamped to avoid failure of the semiconductor switches. Alternatively to a TVS device 8, a varistor or snubber circuit or combination of different overvoltage devices may be used.

Figure 4:
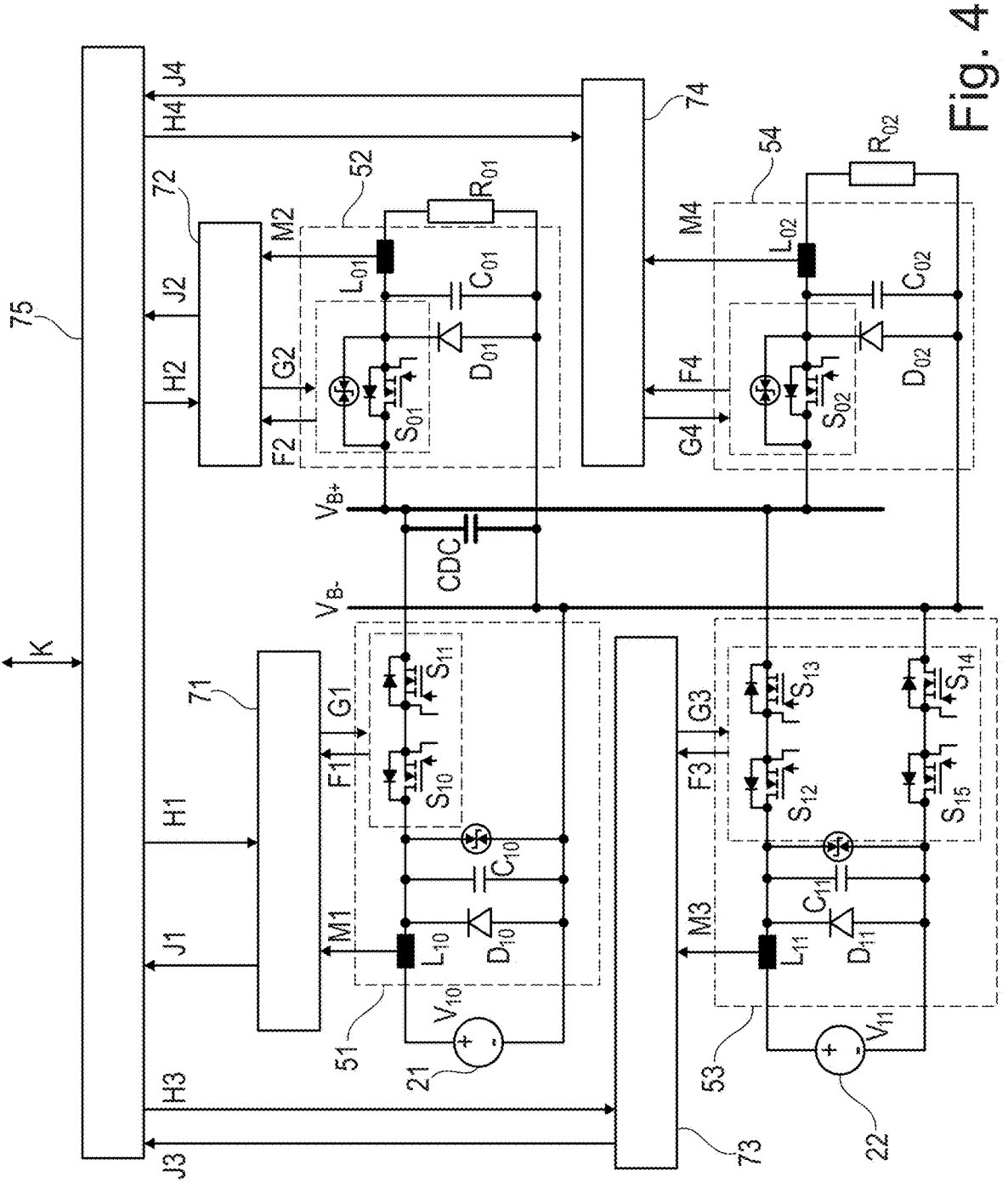
FIG. 4 shows an example of the DC power protection system of FIG. 3 showing additional details about control units controlling the semiconductor switches of the SSCBs.

Summarizing, in FIG. 4, fast fault protection is enabled that prevents the system to collapse in case of a short circuit, wherein the bus voltage is not allowed to fall until the faulty branch is cleared from the fault.

Figure 3:
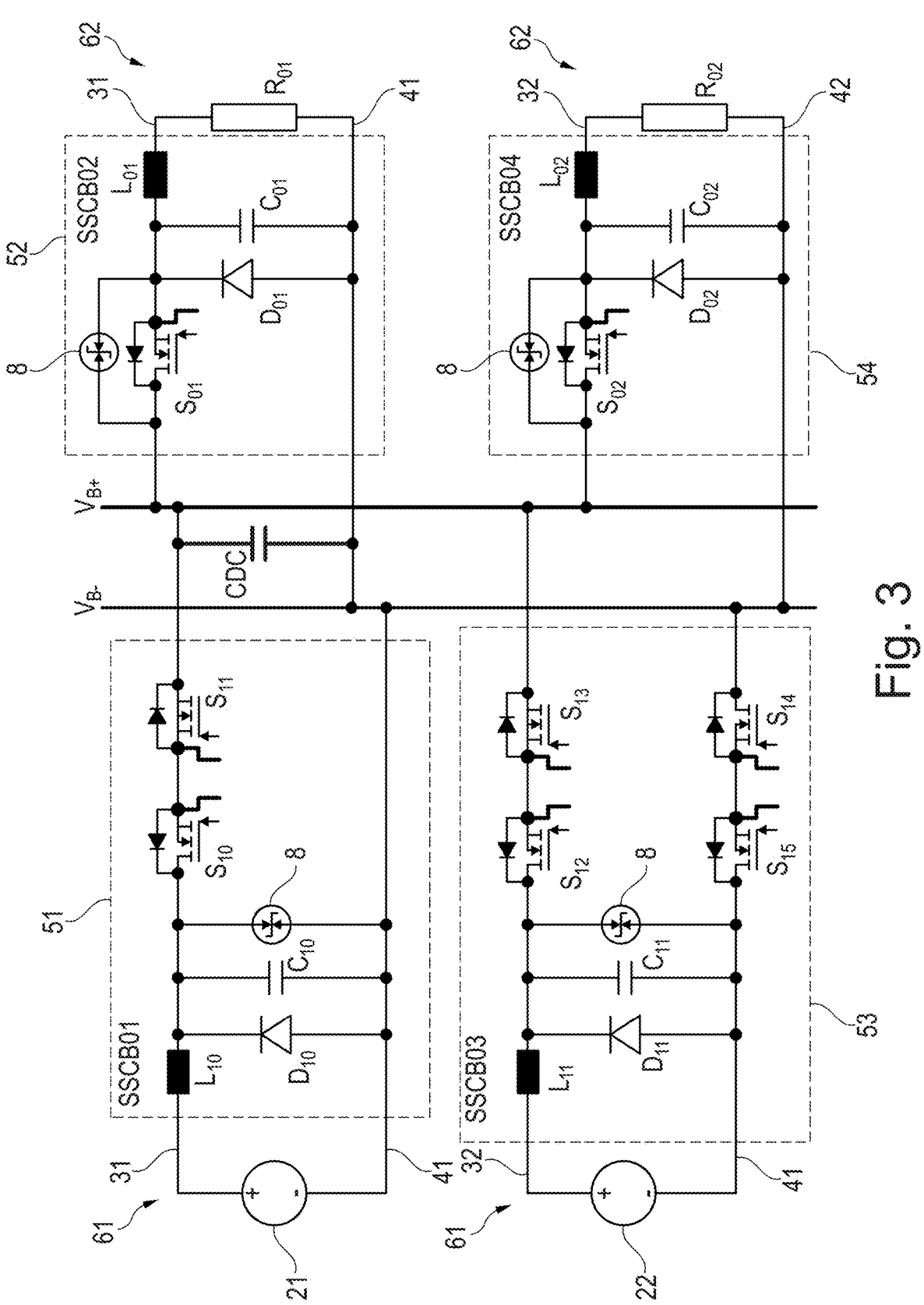
FIG. 3 shows an example of the DC power protection system of FIG. 2, wherein in addition a middle capacitor is provided.

FIG. 3 shows an embodiment of a power protection system that is similar to the embodiment of FIG. 2, except that in addition a middle capacitor CDC is provided for, to which the voltages VB+, VB− apply. The middle capacitor CDC is in addition to the small capacitors C10, C11, C01, C02 and may have a larger capacitance than the small capacitors C10, C11, C01, C02.

One additional advantage of this configuration lies in that capacitor CDC has more capability to hold the bus voltage for a longer time and prevent it from collapsing in case of a short circuit. At the same time, capacitor CDC supports the capacitors C10, C11, C01, C02 in providing a booster current for the respective inductor L10, L01, L11, L02, which allows the capacitors C10, C11, C01, C02 to be even smaller in capacitance. In this respect, it is to be noted that the current from central capacitor CDC in case of a short circuit in the power source/load, while boosting the current through the inductor, is delayed compared to the booster current provided by capacitors C10, C11, C01, C02 because the central capacitor CDC is at a larger distance from the fault condition. Provision of capacitors C10, C11, C01, C02 at the load/power source is thus still relevant for very fast detection of a fault.

FIG. 4 shows a protection circuit/system in accordance with FIG. 3, wherein additional detail about the control system controlling the semiconductor switches is provided for.

As shown in FIG. 4, each SSPC 51-54 is associated with a control unit 71-74, wherein the control units 71-74 measure the inductor voltage over the inductors L10, L01, L11, L02 (arrows M1-M4) and provide gate signals (arrow G1-G4) to the respective semiconductor switches. Accordingly, there is local intelligence in the form of the control units 71-74 that decides to switch the respective semiconductor switches S10, S11, S01, S12-S15, S02 off, which saves time.

The control units 71-74 further receive measurements, error signals, and status signals from the switching units (arrows F1-F4). Each control unit 71-74 may be incorporated with required gate drivers, measurement and conditioning circuits, protection circuits, etc.

To further support fast detection of a fault, the required logic circuit for detecting a voltage change over the inductor may be implemented in a hardware circuit in the control units 71-74.

There is further provided a multi SSCB controller 75 that provides commands to the individual control units 71-74 (arrows H1-H4) and receives measurements, error signals, and status signals from the control units 71-74 (arrows J1-J4). The multi SSCB controller 75 provides for a higher-level control. It may be implemented in a microprocessor or FPGA that oversees the overall operation and monitors parameters from the different SSCB units. The multi SSCB controller 75 may communicate with a higher-level controller (arrow K).

Figure 5:
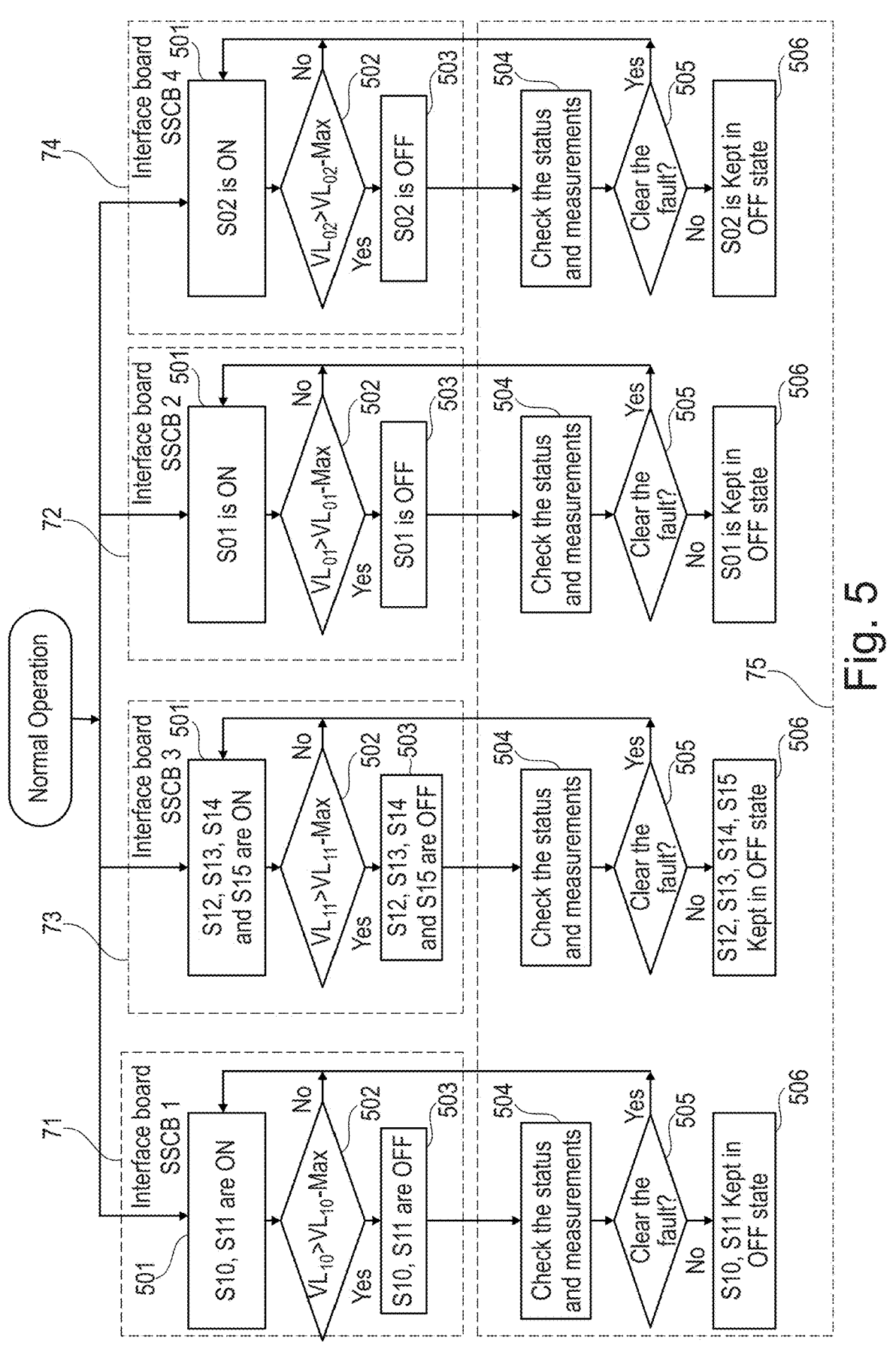
FIG. 5 is a flowchart of an example of a method that the control units of FIG. 4 employ to determine the presence of a fault.

FIG. 5 shows an example control method that is carried out in control units 71-74 and controller 75. In each control unit 71-74, in act 501, it is checked if the respective switches are on. This is the normal condition if there is no fault.

In act 502, it is determined whether the voltage VL10, VL11, VL01, VL02 over the respective inductor L10, L11, L02, L02 is larger than a predetermined threshold VL10_MAX, VL11_MAX, VL01_MAX, VL02_MAX.

In such case, in act 503, the respective switches are turned off.

In case the switches are turned off, in act 504, the status and measurements are checked. The controller software runs series of checks to confirm whether it is a real fault.

If the conditions are acceptable, and/or a fault may be cleared, in act 505, the respective switches are turned on again.

If the conditions are not acceptable and/or the fault cannot be cleared, in act 506, the respective switches are kept in the OFF state.

Acts 501 to 503 may be implemented in the control units 71-74, while acts 504 to 506 may be implemented in the multi SSCB controller 75.

The proposed topology and method may be adopted in safety critical power distribution systems.

Figures 6, 7:
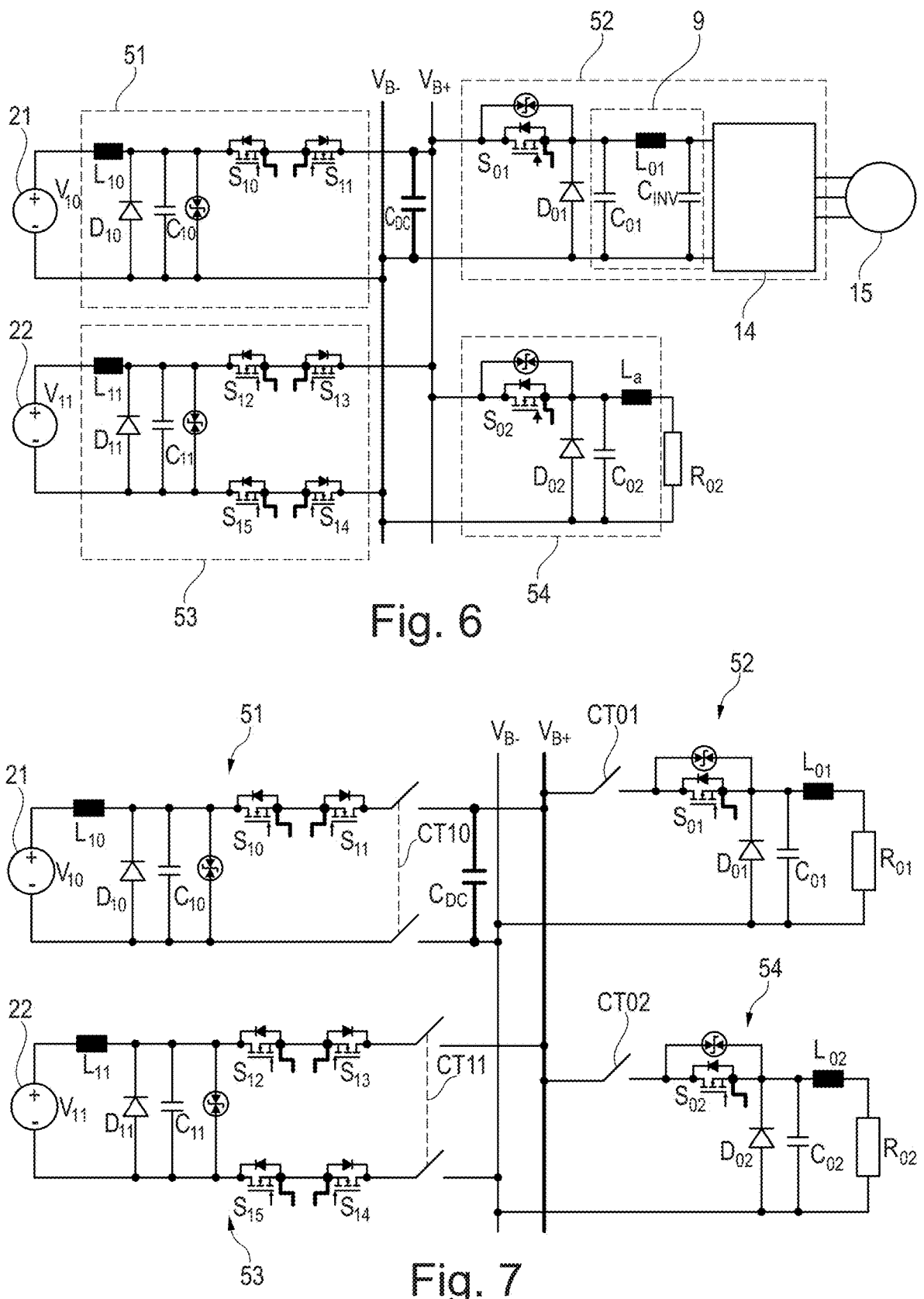
FIG. 6 shows an example of a DC power protection system similar to the DC power protection system of FIG. 3, wherein an SSCB is integral part of a load side converter.
FIG. 7 shows an example of a DC power protection system similar to the DC power protection system of FIG. 3, wherein in addition mechanical contactors are provided for galvanic isolation.

FIG. 6 shows a variant of the embodiment of FIG. 3, wherein the depicted load is an inverter 14 that provides a three-phase current to a motor load 15. In this embodiment, the SSCB 52 is an integral part of the load side converter 14. This enables to use the capacitor C01 and measuring inductor L01 as part of DC link filter of the inverter 14.

More particularly, the load 14 includes a load capacitor $C_{INV}$ which represents a link filter. The link filter buffers energy of the DC link and reduces ripples in the current. Here, the additional small capacitors C01 forms together with the load capacitor $C_{INV}$ and the inductor L01 a third order filter 9. Having an additional capacitor C01 significantly reduces the ripple and required size of the DC link capacitor $C_{INV}$.

Additionally, the inverter 14 and the multi SSCBs may be cooled with a common cooling.

Similarly, SSPC 54 may be an integral part of a load side converter as well, and SSCB 51 and SSCB 53 may be an integral part of a source side structure.

FIG. 7 shows a further variant of the embodiment of FIG. 3, wherein additionally mechanical contactors CT10, CT01, CT11, CT02 are provided, which are connected in series with the SSCBs. The mechanical contactors CT10, CT01, CT11, CT02 provide for galvanic isolation in the positive and negative lanes based on protection requirements.

Such embodiment includes the merits of both SSCBs and contactors. For example, once a fault is cleared by the SSCBs, a contactor CT10, CT01, CT11, CT02 may be used to provide the galvanic isolation. As all protections are in the same housing, they may be controlled with the same control units 71-74 and 75 as discussed with respect to FIG. 4.

It should be understood that the above description is intended for illustrative purposes only and is not intended to limit the scope of the present disclosure in any way. Also, those skilled in the art will appreciate that other aspects of the disclosure may be obtained from a study of the drawings, the disclosure, and the appended claims. All methods described herein may be performed in any suitable order unless otherwise indicated herein or otherwise clearly contradicted by context. Various features of the various embodiments disclosed herein may be combined in different combinations to create new embodiments within the scope of the present disclosure. In particular, the disclosure extends to and includes all combinations and sub-combinations of one or more features described herein. Any ranges given herein include any and all specific values within the range and any and all sub-ranges within the given range.

The invention claimed is:

1. A power protection system comprising:
a first direct current (DC) power source having a positive terminal and a negative terminal;
a first load;
a first power bus connecting the first DC power source and the first load, wherein the first power bus comprises a high side voltage rail connected to the positive terminal and a low side voltage rail connected to the negative terminal;
a first solid state circuit breaker circuit integrated in the first power bus; and
a second solid state circuit breaker circuit,
wherein the first solid state circuit breaker circuit is located at a power source side and the second solid state circuit breaker circuit is arranged at a load side of the power protection system,
wherein the first solid state circuit breaker circuit comprises:
a first semiconductor switch arranged in the high side voltage rail or in the low side voltage rail and configured to be controlled by a controller;
a first capacitor arranged between the high side voltage rail and the low side voltage rail, wherein the first capacitor is arranged between the high side voltage rail and the low side voltage rail closer to the power source or to the first load than the first semiconductor switch, and wherein a terminal of the first capacitor is arranged between the first semiconductor switch and the power source or between the first semiconductor switch and the first load; and
a first inductor in the high side voltage rail or the low side voltage rail, wherein the first inductor is positioned such that current generated by the first capacitor when unloading in case of a short circuit at the power source or at the first load passes the first inductor,
wherein the controller is configured to measure a voltage change over the first inductor and trigger an actuation signal for the first semiconductor switch when the voltage change over the first inductor surpasses a predetermined threshold voltage, and
wherein the second solid state circuit breaker circuit comprises a second semiconductor switch, a second capacitor, and a second inductor.

2. The power protection system of claim 1, wherein a first bypass diode is arranged in parallel to the first capacitor between the high side voltage rail and the low side voltage rail in a blocking direction.

3. The power protection system of claim 1, wherein the first solid state circuit breaker circuit has a bidirectional conductivity and blocking capability.

4. The power protection system of claim 1, wherein the first solid state circuit breaker circuit has a unidirectional conductivity and blocking capability.

5. The power protection system of claim 1, wherein the first semiconductor switch comprises a transistor and a bypass diode in antiparallel to the transistor, and
wherein the transistor is a metal-oxide-semiconductor field-effect transistor (MOSFET), an insulated-gate bipolar transistor (IGBT), a Gallium Nitride (GaN) transistor, or a Silicon carbide (SiC) transistor.

6. The power protection system of claim 1, wherein a transient voltage suppressor device is arranged in parallel to the first semiconductor switch.

7. The power protection system of claim 1, wherein at least one mechanical contactor is arranged in series with a solid state circuit breaker circuit of the power protection system.

8. The power protection system of claim 1, wherein the first load comprises a capacitive load arranged in parallel with the first capacitor, and
wherein the capacitive load, the first capacitor, and the first inductor form a third order filter.

9. The power protection system of claim 1, wherein the controller is configured to measure a voltage over the first inductor, and
wherein the controller is configured turn the first semiconductor switch off when the measured voltage is larger than the predetermined threshold voltage.

10. The power protection system of claim 1, further comprising:
a second DC power source having a positive terminal and a negative terminal;
a second load; and
a second power bus connecting the second DC power source and the second load, wherein the second power bus comprises a high side voltage rail connected to a respective positive terminal and a low side voltage rail connected to a respective negative terminal of a respective power source,
wherein the first and second solid state circuit breaker circuits are integrated in the first power bus and a third and a fourth solid state circuit breaker circuit are integrated into the second power bus,
wherein the high side voltage rail of the first power bus and the high side voltage rail of the second power bus are connected, and
wherein the low side voltage rail of the first power bus and the low side voltage rail of the second power bus are connected.

11. The power protection system of claim 10, further comprising:
a middle capacitor arranged between the high side voltage rail and the low side voltage rail,
wherein the middle capacitor is arranged between the first solid state circuit breaker circuit located at the power source side and the second solid state circuit breaker circuit located at the load side.

12. The power protection system of claim 10, wherein each inductor is associated with a corresponding controller,
wherein each controller is configured to receive an inductor voltage measurement and provide a gate signal to a respective semiconductor switch.

13. The power protection system of claim 1, wherein the first load is an inverter.

14. The power protection system of claim 1, wherein the first capacitor is sized such that a capacitance of the first capacitor is smaller than a capacitance of a capacitive load.

* * * * *